United States Patent [19]

Tiernan

[11] Patent Number: 5,117,593
[45] Date of Patent: Jun. 2, 1992

[54] UNDERGROUND STORAGE SILO FOR EMERGENCY SUPPLIES

[75] Inventor: Barbara H. Tiernan, Saratoga, Calif.

[73] Assignee: The Board of Trustees of the Leland Stanford Junior University, Stanford, Calif.

[21] Appl. No.: 647,813

[22] Filed: Jan. 30, 1991

[51] Int. Cl.⁵ .......................... E04H 1/02; E04B 5/02
[52] U.S. Cl. ..................... 52/20; 52/169.6; 52/309.1
[58] Field of Search ............ 52/169.6, 169.7, 20, 52/245, 19, 309.1; 220/414, 482, 582, DIG. 22, DIG. 23, DIG. 24

[56] References Cited

U.S. PATENT DOCUMENTS

| | | | |
|---|---|---|---|
| 3,097,166 | 7/1963 | Monson | 52/169.6 |
| 3,173,387 | 3/1965 | Cree | 52/169.6 |
| 3,221,881 | 12/1965 | Weiler | 52/169.6 |
| 3,513,605 | 5/1970 | Smith | 52/20 |
| 3,524,780 | 8/1970 | Clements | 52/245 |
| 3,938,284 | 2/1976 | Broadbent | 52/169.6 |
| 4,089,139 | 5/1978 | Moffa | 52/20 |
| 4,112,644 | 9/1978 | Allen | 52/245 |
| 4,709,723 | 12/1987 | Sidaway | 52/169.6 |

FOREIGN PATENT DOCUMENTS

| | | | |
|---|---|---|---|
| 206527 | 11/1984 | Japan | 52/169.6 |
| 883298 | 12/1981 | U.S.S.R. | 52/169.6 |

Primary Examiner—John E. Murtagh
Attorney, Agent, or Firm—Townsend and Townsend

[57] ABSTRACT

An underground silo for storing emergency supplies includes a cylindrical body portion having a closed bottom and side walls and an open top with a flange around the top, a convex cover configured for mating with said open top and having a flange for mating with the flange of the body portion, and a hatch in the cover for accessing stored supplies. The body portion are preferably made of seamless woven fiberglass. The cover includes a lip extending downwardly from the flange for encircling the flange of the body portion. A sealant is provided between the flanges of the cover and body portion to facilitate a fluid tight seal. By placing the silo underground the lives of emergency supplies are extending due to thermal insulation of the underground location.

1 Claim, 3 Drawing Sheets

UNDERGROUND STORAGE SILO FOR EMERGENCY SUPPLIES

BACKGROUND OF THE INVENTION

This invention relates generally to storage silos, and more particularly the invention relates to an underground storage silo for emergency supplies.

Many cities, universities, and businesses have provided containers for emergency supplies for use by large numbers of people following a catastrophe such as an earthquake, fire or flood. Typically, the containers have been above ground, weather resistant shelters in which are stored food, clothing, tools, and medical supplies. However, the stored items are subject to widely varying ambient temperatures and humidity which limit the useful life of the stored items. Food stuffs, for example, have a useful life of no more than five years when stored above ground. Further, the above ground containers occupy surface space and can be unsightly.

The present invention is directed to an underground storage container which is economical, long lived, and increases the useful life of stored items.

SUMMARY OF THE INVENTION

Accordingly, an object of the invention is an improved storage silo which can be placed underground.

Another object of the invention is a storage container which is readily accessed yet hidden from view.

Still another object of the invention is a storage container for emergency supplies which increases the useful life of the stored items.

Briefly, a storage silo in accordance with the invention comprises a seamless body portion including a closed bottom and side walls and an open top with a flange around the open top, a cover configured for mating with the opening, and a hatch in the cover for accessing stored supplies. In a preferred embodiment the body portion is generally cylindrical, and the cover has a mating flange with a lip portion on the outer periphery which seats around the flange of the body portion. A sealant can be provided between the two flanges to effect a water and air tight seal. Preferably, the body and cover are seamless and comprise woven fiberglass sheets. A hatch is provided in the cover to facilitate access to the storage supplies.

The silo is placed underground with suitable drainage provided to prevent submergence in groundwater. The top can be covered with a thin layer of soil to facilitate thermal insulation from the ambient atmosphere as well as for aesthetics.

The invention and objects and features thereof will be more readily apparent from the following detailed description and appended claims when taken with the drawing.

DETAILED DESCRIPTION OF ILLUSTRATIVE EMBODIMENTS

Figure 1:
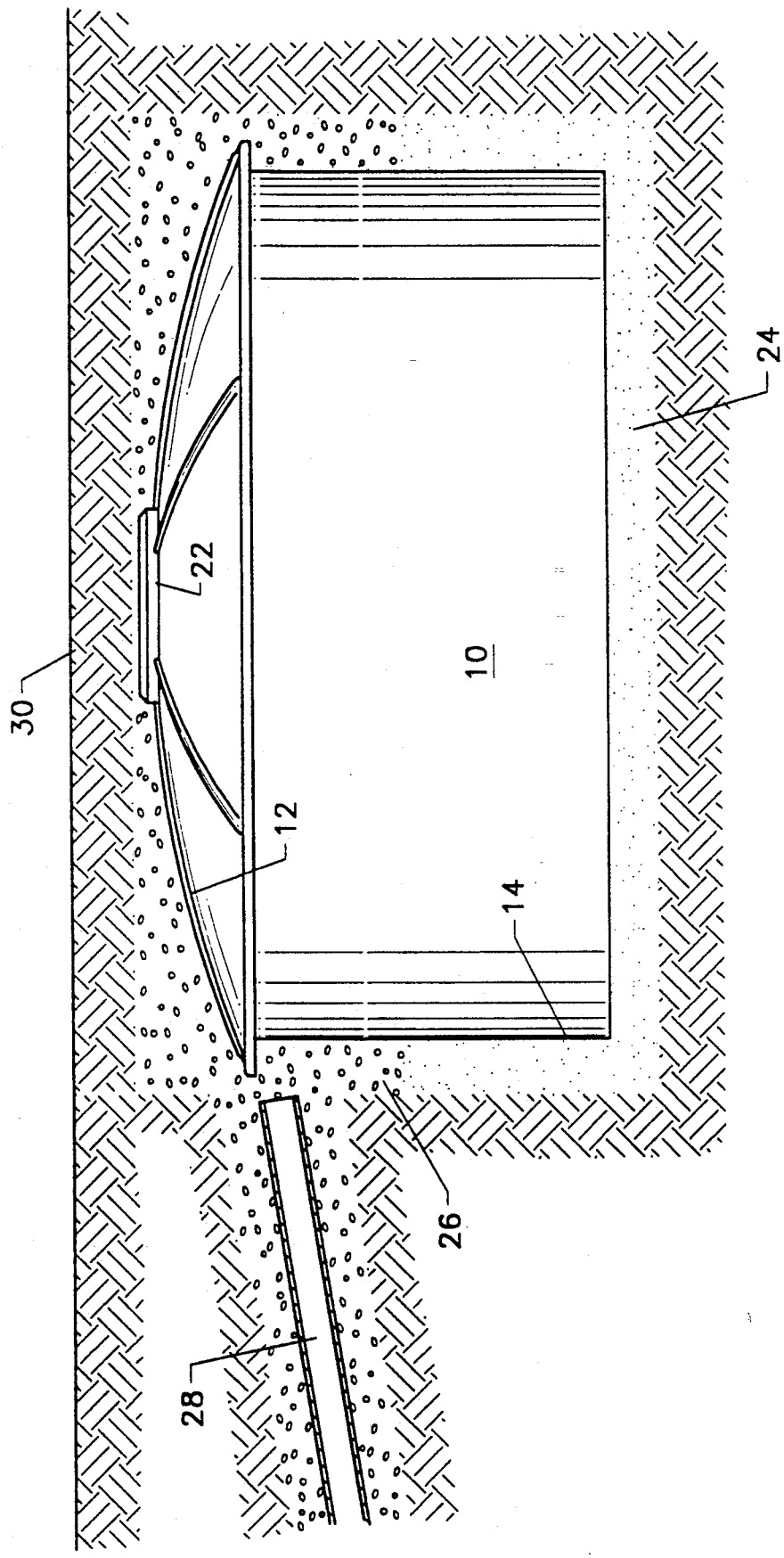
FIG. 1 is a section view illustrating an underground storage silo in accordance with the invention.
Figure 2:
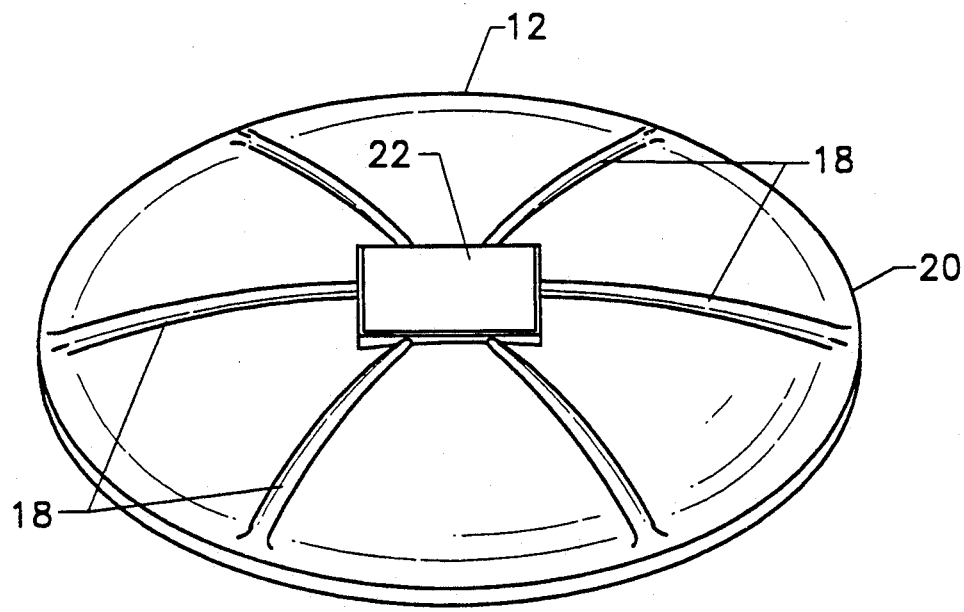
FIG. 2 is a perspective view of one embodiment of the top of the storage silo in FIG. 1.
Figure 3:
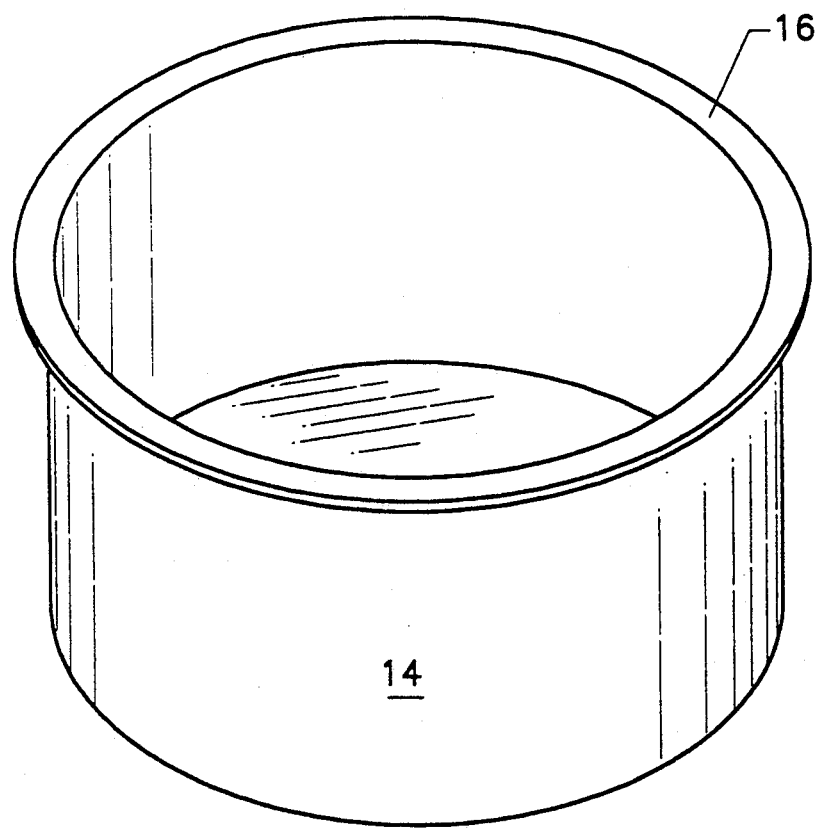
FIG 3 is a perspective view of the body portion of the storage silo of FIG. 1.

Referring now to the drawings, FIG. 1 is a side view in section illustrating an underground silo in accordance with the invention for storing emergency supplies, and FIGS. 2 and 3 are perspective views illustrating the cover and body portion of the underground silo. Preferably both the cover 12 and body portion 14 are seamless and are made of woven fiberglass to prevent groundwater seepage into the silo. In a preferred embodiment the body portion 14 has generally cylindrical side walls and a closed bottom and an open top with a flange 16 around the open top. In one embodiment the cylindrical side walls and the bottom are ¼" thick with the silo having a diameter of 11 feet and a height of 4 feet.

The mating cover 12 is preferably convex in configuration with upstanding ribs 18 providing added strength. The thickness of the cover is ⅜". The periphery of the cover includes a flange portion 20 which mates with the flange 16 of the bottom portion 14. A hatch and cover 22 are provided in the cover 12 to facilitate access to the stored emergency supplies.

As shown in FIG. 1, the silo 10 is placed underground on a bed of sand 24 which extends approximately half way up the side walls of the body portion. Gravel 26 is provided over the cover and down the side walls with a drainage pipe 28 provided below the cover 12 to facilitate water drainage. A thin layer of soil 30 is placed over the cover and hatch 22.

Figure 4A:
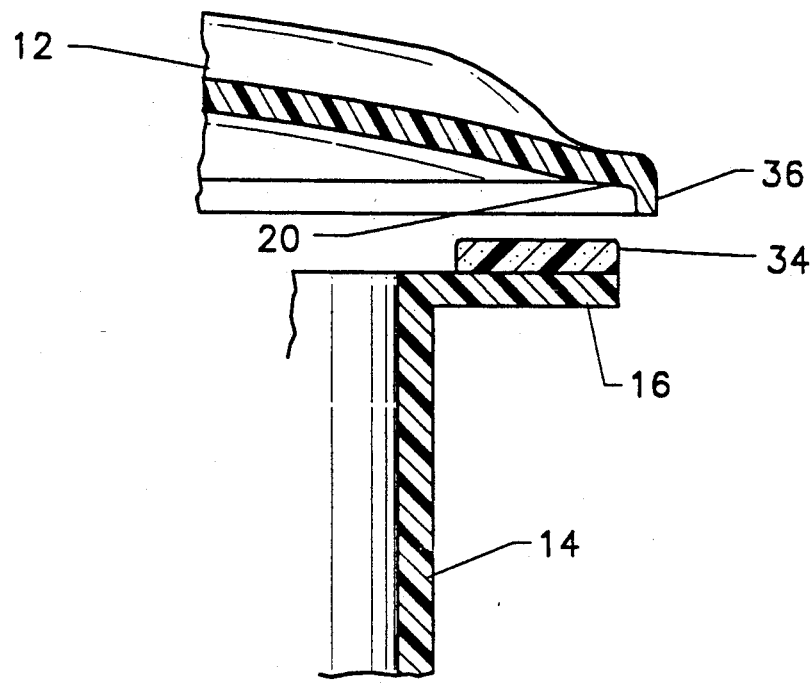
FIG. 4A and FIG. 4B are side views of portions of the cover and body illustrating the assembly thereof.
Figure 4B:
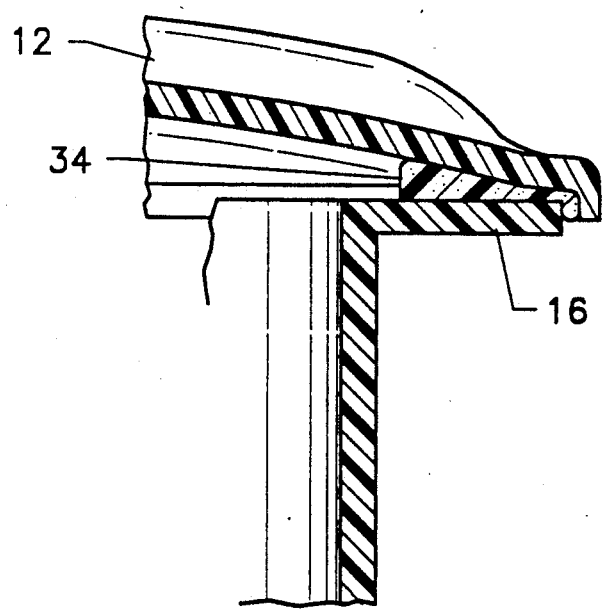

FIGS. 4A and 4B are section views of a portion of the cover 12 and body portion 14 illustrating the mating of the flanges 16, 20. As shown in FIG. 4A, before the cover is placed on the body portion, an annular ring 34 of a foam sealant is provided around the flange 16. When the cover 12 is placed on the body portion as shown in FIG. 4B, the weight of the cover (approximately 200 lbs.) deforms the foam sealant to provide a fluid tight seal between the cover and the body portion. The cover preferably includes a lip 36 extending downwardly from flange 20 which overlaps the flange 16 as shown in FIG. 4B.

Due to the thermal insulation of the underground storage, the lives of emergency food stuffs and plastic or heat sensitive supplies can be extended from approximately 5 years for above ground storage to 15 years or longer. Thermal variations of the underground storage silo will be on the order of 50°–60° F. as compared to 35°–100°+ for above ground storage without air conditioning.

There has been described an improved underground storage silo for emergency supplies which is economical, strong, and increases the useful life of stored items. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

I claim:

1. An underground silo for storing emergency supplies comprising a closed cylindrical body portion of seamless woven fiberglass and including a closed bottom and side walls and an open top with a flange around said open top, a seamless woven fiberglass cover configured for mating with said open top, said cover having a convex outer surface with raised ribs for reinforcement and a flange for mating with said flange of said body portion with a lip extending downwardly from said flange for encircling said flange of said body portion, a sealant between said flange of said cover and said flange of said body portion to facilitate a fluid tight seal, and a hatch in said cover for accessing stored supplies.

* * * * *